United States Patent
Oyama

(10) Patent No.: US 7,421,381 B2
(45) Date of Patent: Sep. 2, 2008

(54) DESIGN SUPPORT METHOD AND DESIGN SUPPORT PROGRAM

(75) Inventor: Kiyoshi Oyama, Shinjuku-ku (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 11/243,337

(22) Filed: Oct. 4, 2005

(65) Prior Publication Data

US 2006/0074613 A1   Apr. 6, 2006

(30) Foreign Application Priority Data

Oct. 5, 2004   (JP)   ............................... 2004-292605

(51) Int. Cl.
G06G 7/48   (2006.01)
G06F 17/10   (2006.01)

(52) U.S. Cl. .............................................. 703/7; 703/2

(58) Field of Classification Search ...................... 700/2, 700/214; 703/1, 7, 2
See application file for complete search history.

(56) References Cited

U.S. PATENT DOCUMENTS

| | | | | |
|---|---|---|---|---|
| 6,605,399 | B2* | 8/2003 | Chowdry et al. | 430/62 |
| 2004/0122551 | A1* | 6/2004 | Ogawa et al. | 700/214 |
| 2005/0197239 | A1* | 9/2005 | Bomba et al. | 492/7 |
| 2006/0005391 | A1* | 1/2006 | Bomba | 29/895.2 |

FOREIGN PATENT DOCUMENTS

JP   11-116133 A   4/1994

(Continued)

OTHER PUBLICATIONS

Okamoto et al., Study on Velocity Characteristics and Mechanics of Paper Feeding with Rubber-Covered Roller Drive, The Japan Society of Mechanical Engineers International Journal, pp. 475-482, vol. No. 00-0518, c 2001 Japan, only abstract is translated.

(Continued)

Primary Examiner—Hugh Jones
(74) Attorney, Agent, or Firm—Rossi, Kimms & McDowell, LLP.

(57) ABSTRACT

The present invention provides a design support method adapted to support a design of a conveying path by performing simulation of a behavior of a sheet-shaped flexible medium being conveyed in the conveying path and comprising a conveying condition setting step for setting a conveying condition of a conveying roller for conveying the flexible medium, a roller nip calculation step for preparing a finite element model of a conveying roller pair including the conveying roller and for calculating of deformation of the conveying roller in a nip portion of the conveying roller pair, and a motion calculating step for calculating the behavior of the flexible medium in a time-series manner on the basis of the deformation of the conveying roller calculated in the roller nip calculating step regarding a portion of the flexible medium conveyed by the conveying roller pair having the finite element model prepared in the roller nip calculating step and calculating the behavior of the flexible medium in a time-series manner without preparing the finite element model regarding a portion of the flexible medium not conveyed by the conveying roller pair having the finite element model prepared in the roller nip calculating step.

9 Claims, 17 Drawing Sheets

FOREIGN PATENT DOCUMENTS

| | | |
|---|---|---|
| JP | 10-181931 A | 7/1998 |
| JP | 11-120216 A | 4/1999 |
| JP | 11-195052 A | 7/1999 |
| JP | 2000-331037 A | 11/2000 |
| JP | 2001-306633 A | 11/2001 |
| JP | 2002-140372 A | 5/2002 |

OTHER PUBLICATIONS

Yoshida, Kazushi, Dynamic Analysis of Sheet Deformation Using Spring-Mass-Beam Model, The Japan Society of Mechanical Engineers International Journal, pp. 230-235, vol. No. 96-1530, c 1997 Japan, only abstract is translated.

* cited by examiner

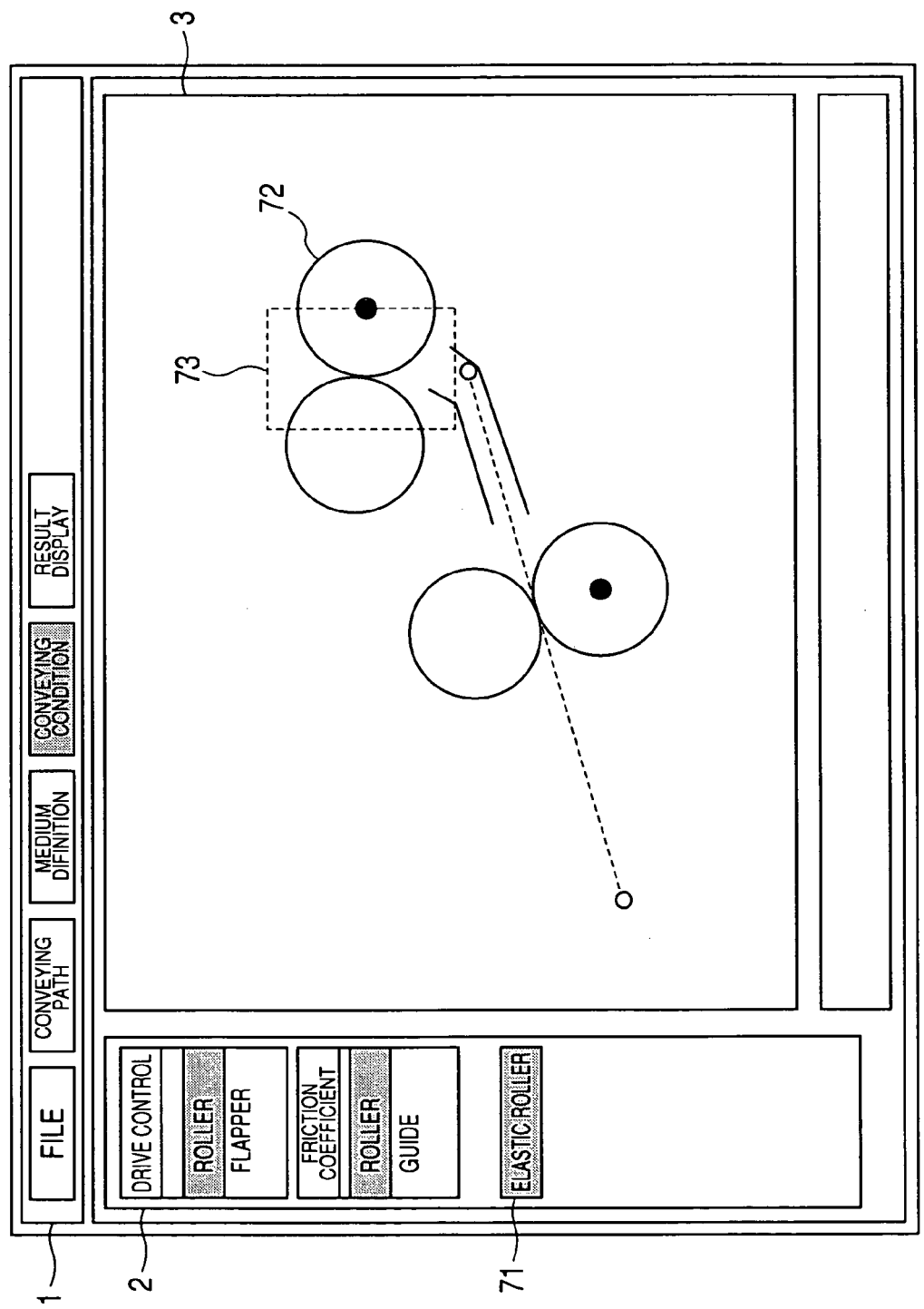

FIG. 13

CALCULATING OF SPEED FLUCTUATION RATE

| | | |
|---|---|---|
| DRIVE ROLLER DIAMETER | 60 | mm |
| DRIVEN ROLLER DIAMETER | 60 | mm |
| PRESSURE FORCE | 100 | kgf |
| RUBBER THICKNESS (DRIVE) | 2.5 | mm |
| RUBBER THICKNESS (DRIVEN) | 2.0 | mm |
| YOUNG'S MODULES OF RUBBER | 1.5 | Mpa |

SPEED FLUCTUATION RATE  1.055 ~74

DESIGN SUPPORT METHOD AND DESIGN SUPPORT PROGRAM

BACKGROUND OF THE INVENTION

1. Field of the Invention

The present invention relates to a design support method and design support program suitable for achieving an optimum design of a conveying path by analyzing a behavior of a sheet-shaped member such as a paper by using simulation when the sheet-shaped member is conveyed in an apparatus such as a copying machine and the like.

2. Related Background Art

In designing a conveying path, it is preferable that functions of a designed object are examined under various conditions before the object is actually manufactured because the number of manufacturing and testing steps for trial manufacture of the object can be reduced and a developing time period and a developing cost can be reduced. As techniques for simulating the behavior of the paper in the conveying path by means of a computer for such a purpose, design support systems as disclosed in Japanese Patent Application Laid-open Nos. H11-195052 (1999) and H11-116133 (1999) have been proposed. This technique is a design support system in which a conveying resistance and contact angles between a flexible medium and guides are evaluated by representing the flexible medium as a finite element by means of a finite element method and by judging contact conditions between the flexible medium and guides and/or rollers in the conveying path and by solving a motion equation numerically.

Further, as described in a document "The Japan Society of Mechanical Engineers International Journal (JSME International Journal)" (written by KAZUSI YOSHIDA; 96-1530, C(1997), 230-236 pages), a technique in which a calculation speed is enhanced by representing the flexible medium by mass and spring more simply has been disclosed.

The motion of the flexible medium is solved by numerical value time integration. That is to say, the motion of the flexible medium is solved by forming a motion equation of the flexible medium represented by the finite element or a mass-spring system separately and by dividing an analysis subject time into time steps having finite widths and by calculating acceleration, speed and displacement which are unknown values successively for each time step from a time 0. As techniques for solving the movement of the flexible medium, a NEWMARK β method, a WILLSON θ method, an Euler method, a KUTTA-MERSON method and the like are well known.

Further, for example, a technique described in a document "The Japan Society of Mechanical Engineers International Journal (JSME International Journal)" (written by NORIAKI OKAMOTO et. al; 67-654, C(2001), 185-192 pages) is also known. This technique is a contact structure analysis technique, using a finite element model, for calculating a fluctuation rate regarding a denomination value of a conveying speed caused by deformation of an elastic material such as a roller under pressure.

According to this technique, a roller is deformed as shown in FIG. 16 by a pressure force. A portion of the roller 81 subjected to pressure caused by the contact between the roller and a paper P is called as a nip portion 82 and the paper as a flexible medium is contacted with the roller 81 and conveyed at the nip portion 82. The roller 81 is being driven in a direction shown by the arrow a. When the roller 81 is rotated by Δø as shown in FIG. 17, a shifting amount (arrow Lo) of a periphery of the roller at a non-deformed point remote from the nip portion becomes R×Δø (where, R is a radius of the roller).

However, at the nip portion 82, since the surface of the roller is stretched in a circumferential direction as shown by the arrow b, even when the roller is rotated by the same amount of Δø, a shifting amount (arrow Ln) of the surface of the roller becomes greater than the above-mentioned value. Accordingly, the conveying speed becomes faster by an amount corresponding to the elongation of the roller in the nip portion. This speed fluctuation rate is varied with parameters such as a thickness, hardness and a pressure force of the roller and the like.

Further, the shape of the nip portion 82 is also varied with the above-mentioned parameters of a pair of rollers 81 and 83. In the example shown in FIG. 16, the thickness of rubber of the roller 81 is greater than that of the roller 83 and the hardness of the roller 81 is substantially equal to that of the roller 83. The radii R of both rollers 81 and 83 are the same. Accordingly, the shape of the nip portion 82 is convex toward an upward direction and is like an arc having a radius greater than the radius R of the roller.

As a result, when the paper P is being conveyed by the roller 81, a posture of the paper directs along substantially tangential lines with respect to curves near both ends of the nip portion, as shown by the arrow 84a at the inlet of the nip portion and the arrow 84b at the outlet. Accordingly, the posture of the paper in the nip portion is changed in accordance with the shape of the nip portion.

In the above-mentioned design support program, a user can set a speed for conveying the flexible medium by inputting design values of the rollers. However, the speed of the roller for conveying the flexible medium may not be determined in a meaning manner from the radius and the rotation speed of the roller. In this case, in the actual designing, the target conveying speed of the roller may not be obtained and unexpected tensioning and great slack are caused between the pair of rollers to jam the paper, thereby causing a defect image.

Further, the change in the posture of the flexible medium in the nip portion between the rollers cannot be estimated, so that an introducing direction of the flexible medium into the nip portion and a guiding direction of the flexible medium from the nip may become improper to trap the flexible medium, thereby causing the paper jam.

The speed fluctuation of the roller is caused by the fact that the elastic material such as rubber constituting the roller is deformed by the pressure force to change the peripheral length of the roller nip portion. Further, the change in posture of the flexible medium in the nip portion is caused by the fact that the shape of the elastic material is changed by the pressure force. Amounts of the change in the peripheral length and the change in the shape are determined by factors such as material and hardness of the roller, thickness of the rubber layer, load and the like and, thus, it is difficult to specify these amount values from a simple calculation equation.

There was a need for performing, with higher accuracy, behavior simulation such as elongation and slack in the flexible medium, trapping of the flexible medium before and after the rollers and the like, by estimating such speed fluctuation and posture change.

In the prior art, the speed fluctuation rate caused by the elastic deformation of the rollers can be estimated by contact structure analysis using the finite element model.

However, if the contact structure analysis is applied to the whole conveying path including the elastic deformation of the rollers, it takes a long time to manufacture the model and to perform the calculations, so that there arose a problem that the incorporation of the contact structure analysis into the design support program for supporting the design of the conveying path is not practical.

SUMMARY OF THE INVENTION

In order to solve such a problem, an object of the present invention is to calculate speed change and posture change of a flexible medium caused by deformation of a nip portion between a pair of conveying rollers formed by elastic materials with small calculation load and short time.

To achieve the above object, the present invention provides a design support method adapted to support a design of a conveying path by performing simulation of a behavior of a sheet-shaped flexible medium being conveyed in the conveying path and comprising a conveying condition setting step for setting a conveying condition of a conveying roller for conveying the flexible medium, a roller nip calculation step for preparing a finite element model of a conveying roller pair including the conveying roller and for calculating of deformation of the conveying roller in a nip portion of the conveying roller pair, and a motion calculating step for calculating the behavior of the flexible medium in a time-series manner on the basis of the deformation of the conveying roller calculated in the roller nip calculating step regarding a portion of the flexible medium conveyed by the conveying roller pair having the finite element model prepared in the roller nip calculating step and calculating the behavior of the flexible medium in a time-series manner without preparing the finite element model regarding a portion of the flexible medium not conveyed by the conveying roller pair having the finite element model prepared in the roller nip calculating step.

Further, the present invention provides a design support program capable of reading a computer for supporting a design of a conveying path by performing simulation of a behavior of a sheet-shaped flexible medium being conveyed in the conveying path, and the computer performs a conveying condition setting step for setting a conveying condition of a conveying roller for conveying the flexible medium, a roller nip calculation step for preparing a finite element model of a conveying roller pair including the conveying roller and for calculating of deformation of the conveying roller in a nip portion of the conveying roller pair, and a motion calculating step for calculating the behavior of the flexible medium in a time-series manner on the basis of the deformation of the conveying roller calculated in the roller nip calculating step regarding a portion of the flexible medium conveyed by the conveying roller pair having the finite element model prepared in the roller nip calculating step and calculating the behavior of the flexible medium in a time-series manner without preparing the finite element model regarding a portion of the flexible medium not conveyed by the conveying roller pair having the finite element model prepared in the roller nip calculating step.

The other objects and features of the present invention will be apparent from the following detailed description of the present invention and the accompanying drawings.

BRIEF DESCRIPTION OF THE DRAWINGS

FIG. 12 is a view for explaining an elastic roller definition step;

FIG. 13 is a view for explaining a parameter input picture plane;

DESCRIPTION OF THE PREFERRED EMBODIMENTS

Now, embodiments of the present invention will be concretely explained with reference to the accompanying drawings.

Figure 1:
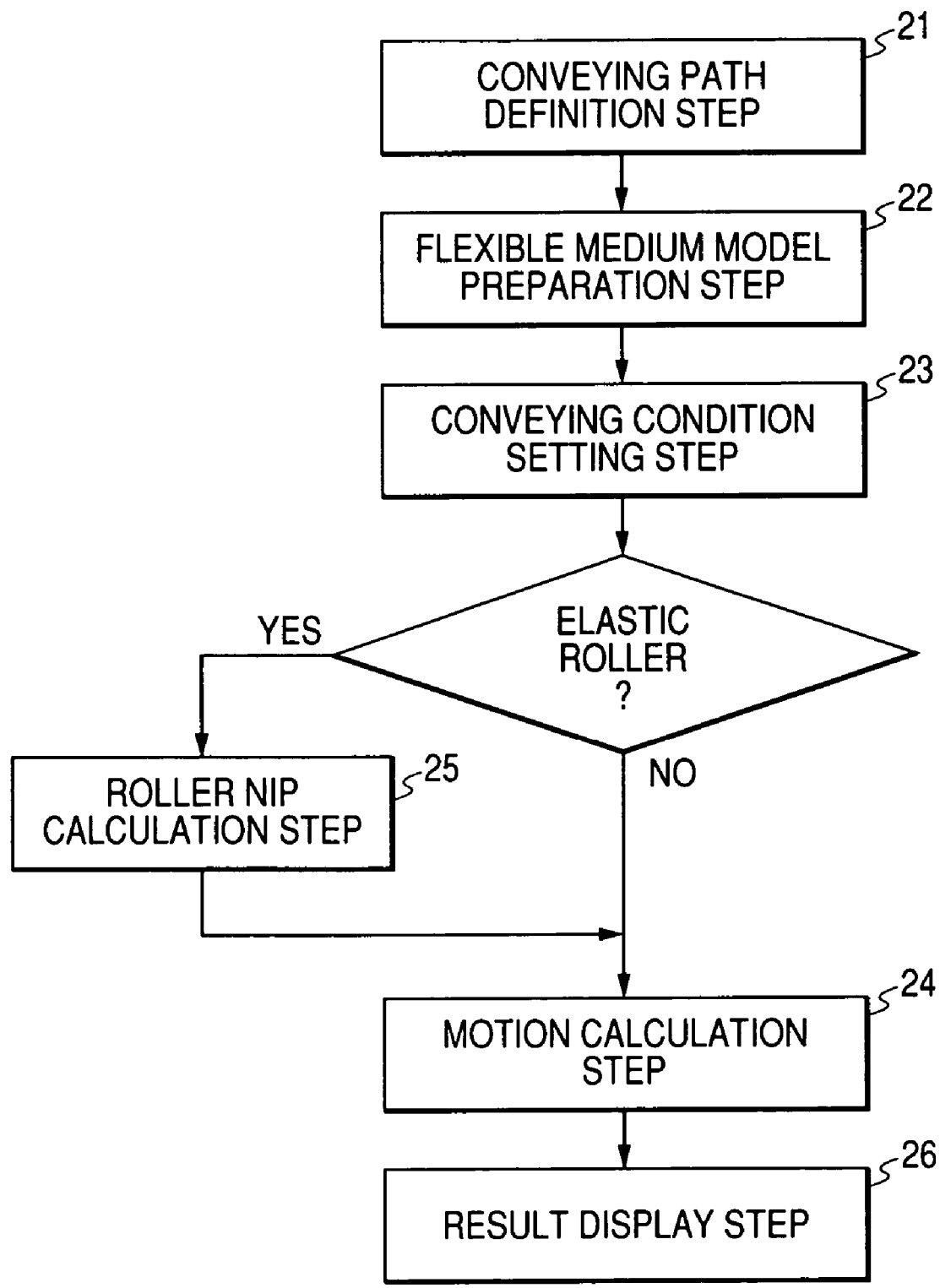
FIG. 1 is a flow chart of a design support program of the present invention.

FIG. 1 is a flow chart for explaining an example of a procedure for carrying out various steps in processing of a design support program according to an embodiment of the present invention. As shown in FIG. 1, the design support program according to the embodiment of the present invention performs the processing by carrying out six steps successively. Here, the six steps include a conveying path definition step 21, a flexible medium model preparation step 22, a conveying condition setting step 23, a motion calculation step 24, a roller nip calculation step 25 (if an elastic roller is used) and a result display step 26. Incidentally, a program for causing a computer to carry out these steps is stored in a hard disc or a ROM in the computer.

Figure 2:
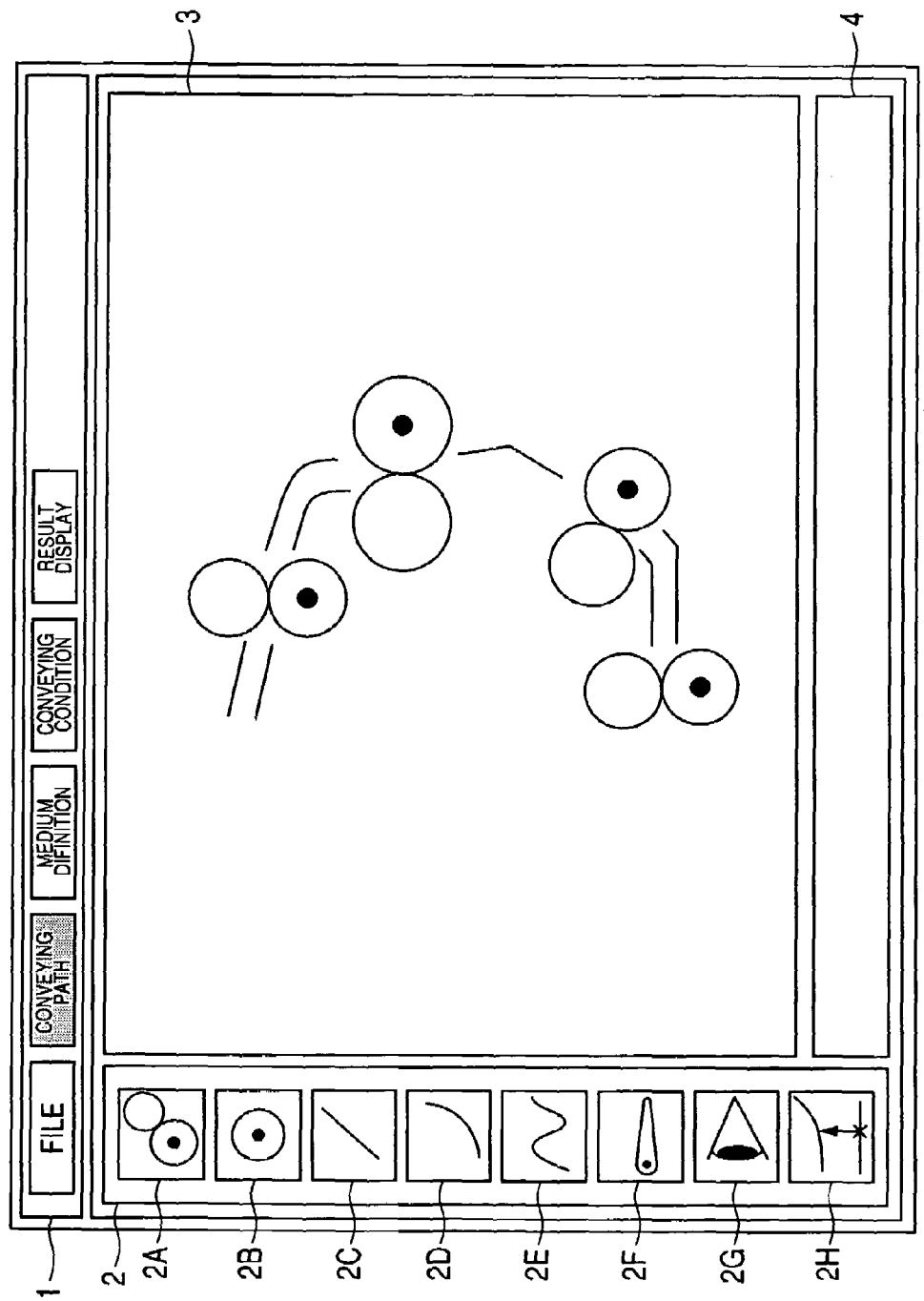
FIG. 2 is a view for explaining a picture plane or screen arrangement of a conveying mechanism definition step.

FIG. 2 shows an example of a picture plane of the program. The picture plane or screen is constituted by a menu bar 1 for mainly switching the steps, a sub-arrangement menu 2 for each step, a graphical screen 3 on which a defined conveying path and a result are displayed, and a command column 4 used for outputting a program message and inputting a numerical value if necessary.

The details of the processing will be described below on the basis of screen arrangement views.

(Conveying Path Definition Step)

First of all, the conveying path definition step 21 will be explained. In order to define the conveying path, when a "conveying path" button in the menu bar 1 is depressed, the sub arrangement menu 2 of the conveying path definition step 21 is displayed to have a desired range area at a left side of the screen, as shown in FIG. 2. The sub arrangement menu 2 can display a roller pair definition button 2A for defining a pair of conveying rollers by two rollers, a roller definition button 2B for defining one roller solely and a straight guide definition button 2C for defining a straight conveying guide. Further, an arc conveying path definition button 2D for defining an arc conveying guide, a spline guide definition button 2E for defining a conveying guide by a spline curve and a flapper definition button 2F for defining a flapper for switching the path though which the flexible medium is conveyed can also be displayed. Further, a sensor definition button 2G for defining a sensor for detecting whether or not the flexible medium exists at a predetermined position in the conveying path can be displayed.

These buttons 2A to 2G are parts constituting an actual conveying path of a copying machine, a printer or the like. Accordingly, it is desirable that all of parts required for constituting the conveying path for the flexible medium such as a paper be prepared. When the definition of the constructional parts is executed by the sub arrangement menu, a position shape is reflected oh the graphic screen 3.

Explaining more concretely, when the roller pair definition button 2A is selected, a diameter, material, position and pressure force of each of two rollers can be selected or set if desired. Similarly, when the roller definition button 2B is selected, a diameter, material and position of one roller can be set.

When the straight guide definition button 2C is selected, a length, position and material of the guide can be set and, similarly, the arc guide definition button 2D can set a center position and a radius of the arc. When the spline guide definition button 2E is selected, the shape of the guide can be determined by defining several points on the curved line and a material of the guide can also be set.

When the flapper definition button 2F or the sensor definition button 2G is selected, a position of the flapper or the sensor can be selected or set.

(Flexible Medium Model Preparation Step)

After the definition of the conveying path in the conveying path definition step 21 is finished, the flexible medium model preparation step 22 is started.

Figure 3:
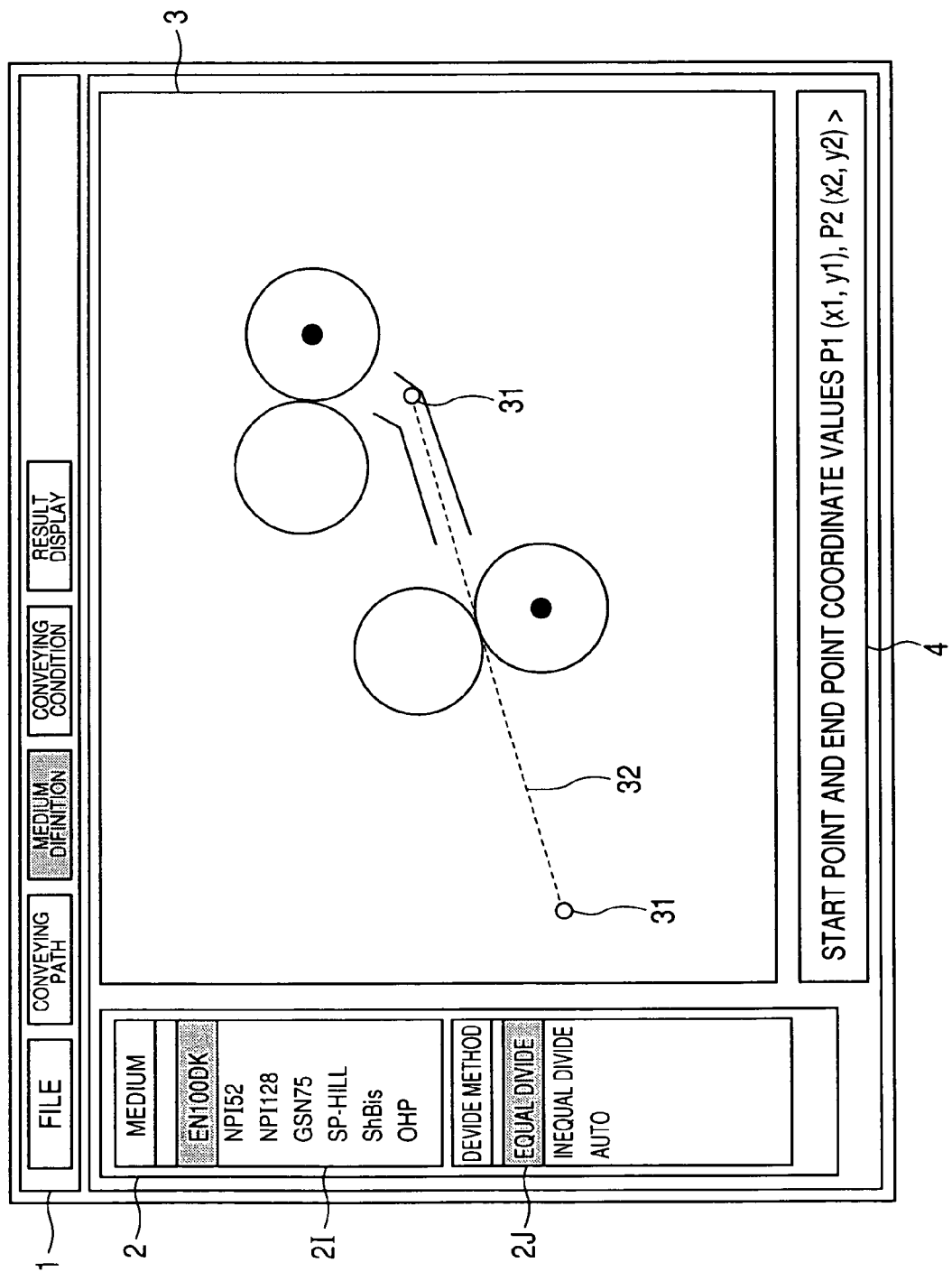
FIG. 3 is a view for explaining a flexible medium definition step.

In the illustrated embodiment, by selecting a "medium definition" button provided in the menu bar 1 of FIG. 2, the flexible medium model preparation can be started. An example of a screen display in the flexible medium model preparation is shown in FIG. 3. In the flexible medium model preparation screen executed by depressing the "medium definition" button in the menu bar 1, a medium kind selection screen 2I and a divide method selection screen 2J are displayed at the sub menu arrangement menu 2.

Here, first of all, in order to determine the position of the flexible medium in the conveying path, a message demanding the inputting of coordinate values of both ends of the flexible medium is displayed from the command column 4. The coordinate values can be inputted numerically in the command column 4 or can be inputted by directly giving instruction to the graphic screen 3 by means of a pointing device such as a mouse provided in the computer. At the time when the coordinate values of the ends are designated, a straight line (broken line) 32 connecting between the both ends 31 is drawn on the graphic screen 3 so that it can be ascertained how the flexible medium is positioned in the conveying path.

After the flexible medium is positioned, since a message demanding the inputting of divide number n upon separating or dividing the flexible medium represented by the straight line (broken line) 32 into a plurality of spring-mass systems, is displayed on the command column 4, the desired divide number n is inputted to the command column 4. In the illustrated embodiment, an example when the divide number is 10 is shown.

Names of various kinds of representative papers were previously registered in the medium kind selection screen 2I so that the flexible medium to be calculated can be selected by a clicking operation.

Calculation parameters required for calculating the motion of the flexible medium in the conveying path are information regarding Calculation parameters required for calculating the motion of the flexible medium in the conveying path are information regarding Young's modulus, density and thickness of the flexible medium and these parameters are assigned to the paper kind displayed in the medium kind selection screen 2I as data base. In FIG. 3, although EN100DK as a representative reproduction paper is selected as the medium kind, this means that values such as Young's modulus of 5409 MPa, density of $6.8 \times 10^{-7}$ kgf/mm$^3$ and paper thickness of 0.0951 mm of the EN100DK are selected from the data base.

Figure 4:
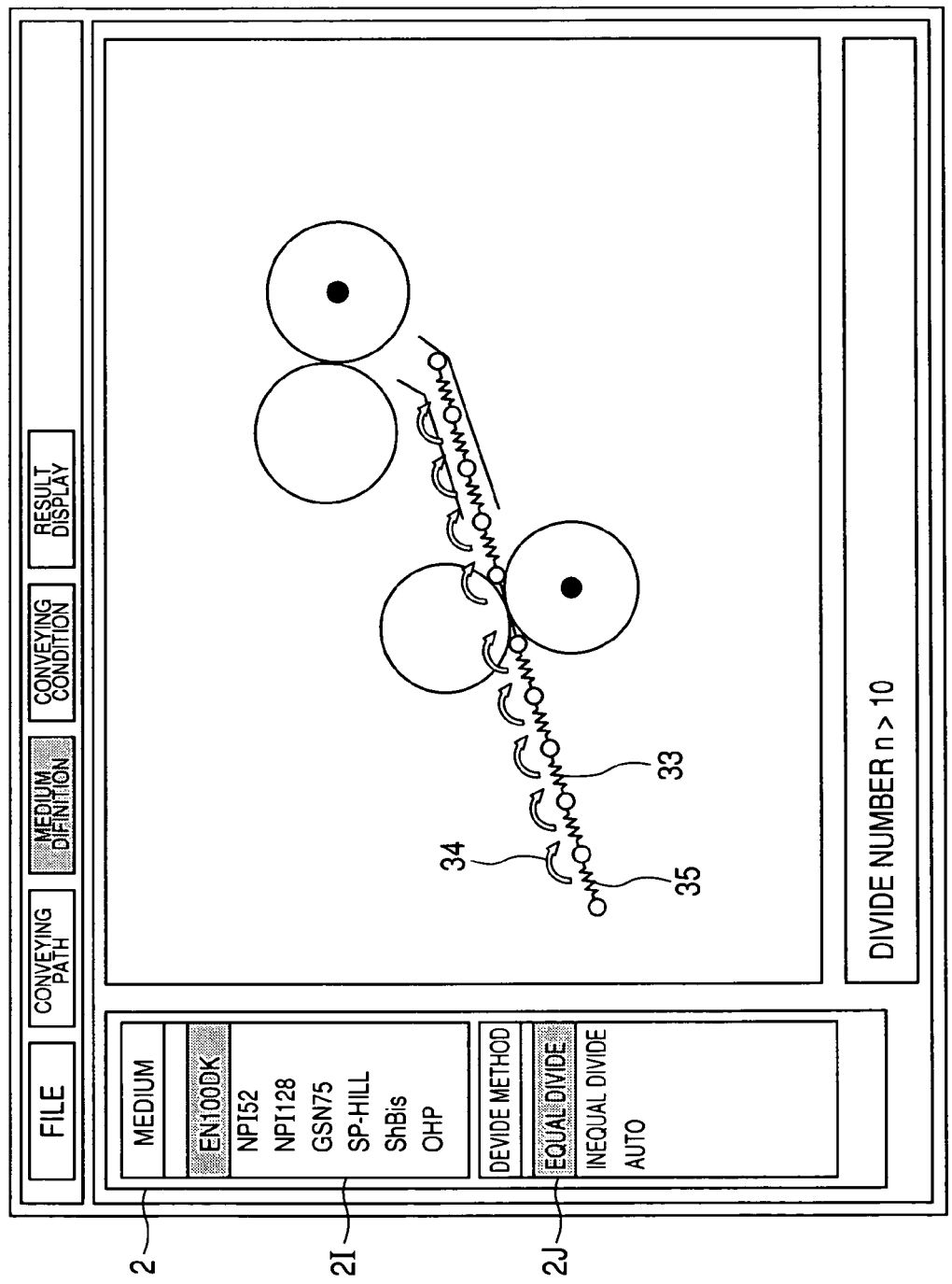
FIG. 4 is a view for explaining a divide operation based on a first invention.

FIG. 4 shows an example of the flexible medium model preparation performed by equal divide. By selecting "equal divide" in the divide method selection screen 2J of the "medium definition" screen shown in FIGS. 3 and 4, the installed flexible medium can be equally divided.

More specifically, mass points 33 are arranged at positions equidistantly dividing the straight line (broken line) 32 shown in the graphic screen 3 of FIG. 3 into ten sections in this manner. At the same time, a model in which mass points are connected to each other by rotation springs 34 and translation springs 35 is prepared and this model is displayed on the graphic screen 3 (FIG. 2).

The rotation spring 34 connecting between the mass points represents flexural rigidity and the translation spring 35 represents tensile rigidity, when the flexible medium is regarded as an elastic body. Spring constants of both springs can be derived from elasticity theory. The spring constant KR of the rotation spring and the spring constant KS of the translation spring are given by the following equations (1-1) and (1-2) shown by using Young's modulus E, width W, paper thickness T and distance $\Delta L$ between the mass points:

$$kr = \frac{Ewt^3}{12\Delta L}, \; ks = \frac{Ewt}{\Delta L}, \quad (1-1)$$

$$\Delta L = \frac{\sqrt{(x_2 - x_1)^2 + (y_2 - y_1)^2}}{n} \quad (1-2)$$

When it is assumed that a length of the flexible medium is L, a width is M, a paper thickness is T, density is $\rho$ and divide number is N, the mass M of the mass point is calculated from the following equation (2):

$$M = LWT\rho/(N-1) \quad (2)$$

In this way, the flexible medium is model-designed as an elastic body reacting to a bending force and a tensile force in the program.

(Conveying Condition Setting Step)

After the separation into the spring-mass elements by the flexible medium model preparation is finished, the conveying condition setting step 23 is started. In the conveying condition setting step 23, a driving condition of the conveying roller, control of the flapper for switching the conveying path and friction coefficients caused by the contacts between the flexible medium and the rollers and conveying guide are defined.

Figure 5:
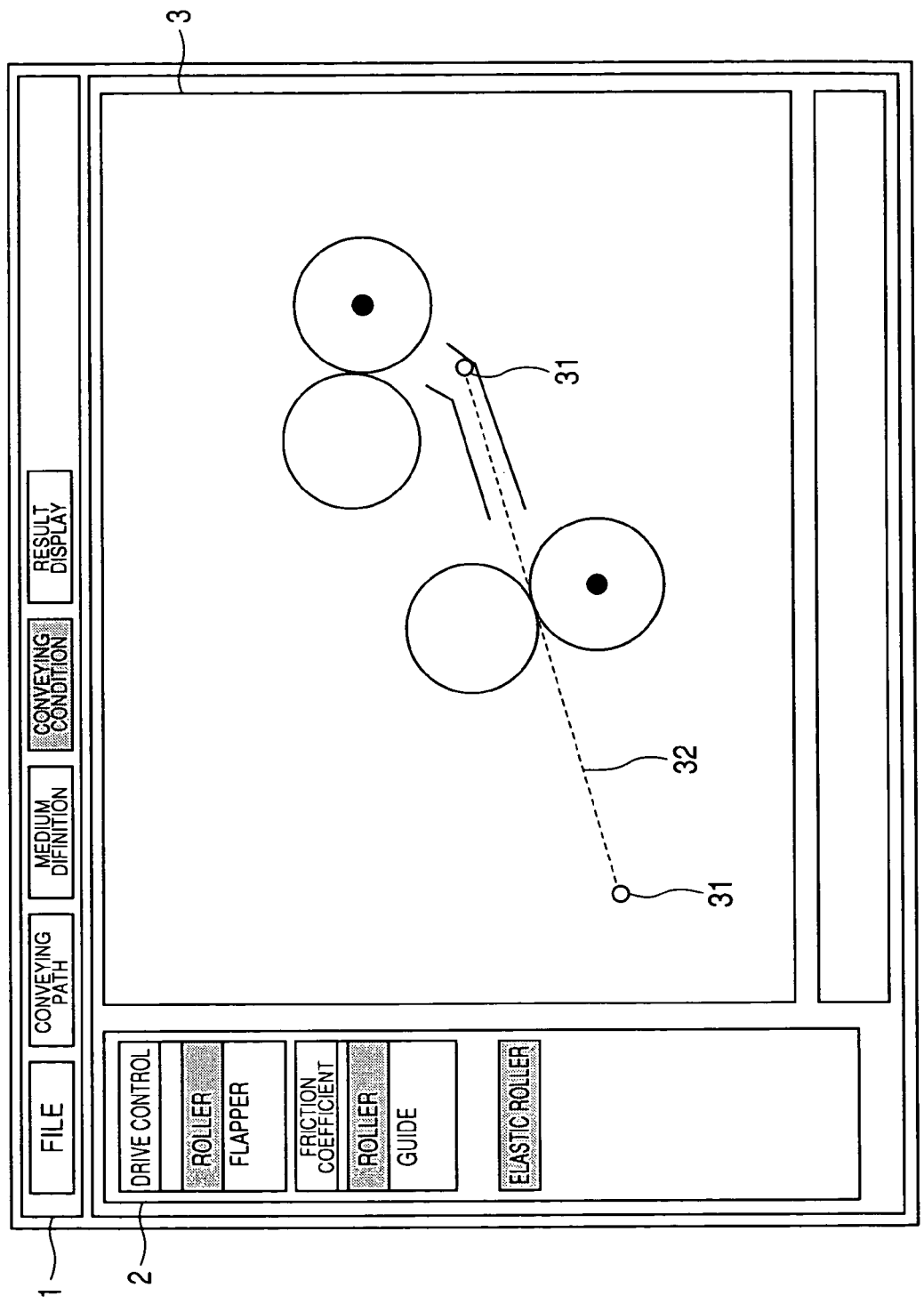
FIG. 5 is a view for explaining a conveying condition definition step.

FIG. 5 is a view for explaining execution of the conveying condition setting step 23. When a "conveying condition" button in the menu bar 1 is depressed, a screen for defining the driving condition, friction coefficient and elastic roller is displayed on the sub arrangement menu 2. FIG. 5 shows an example of inputting of drive control of the roller and a stage which selects a driving condition "roller" in the sub arrangement menu 2 is shown (in FIG. 5, a roller portion of the sub arrangement menu 2 is reversely displayed).

Figure 6:
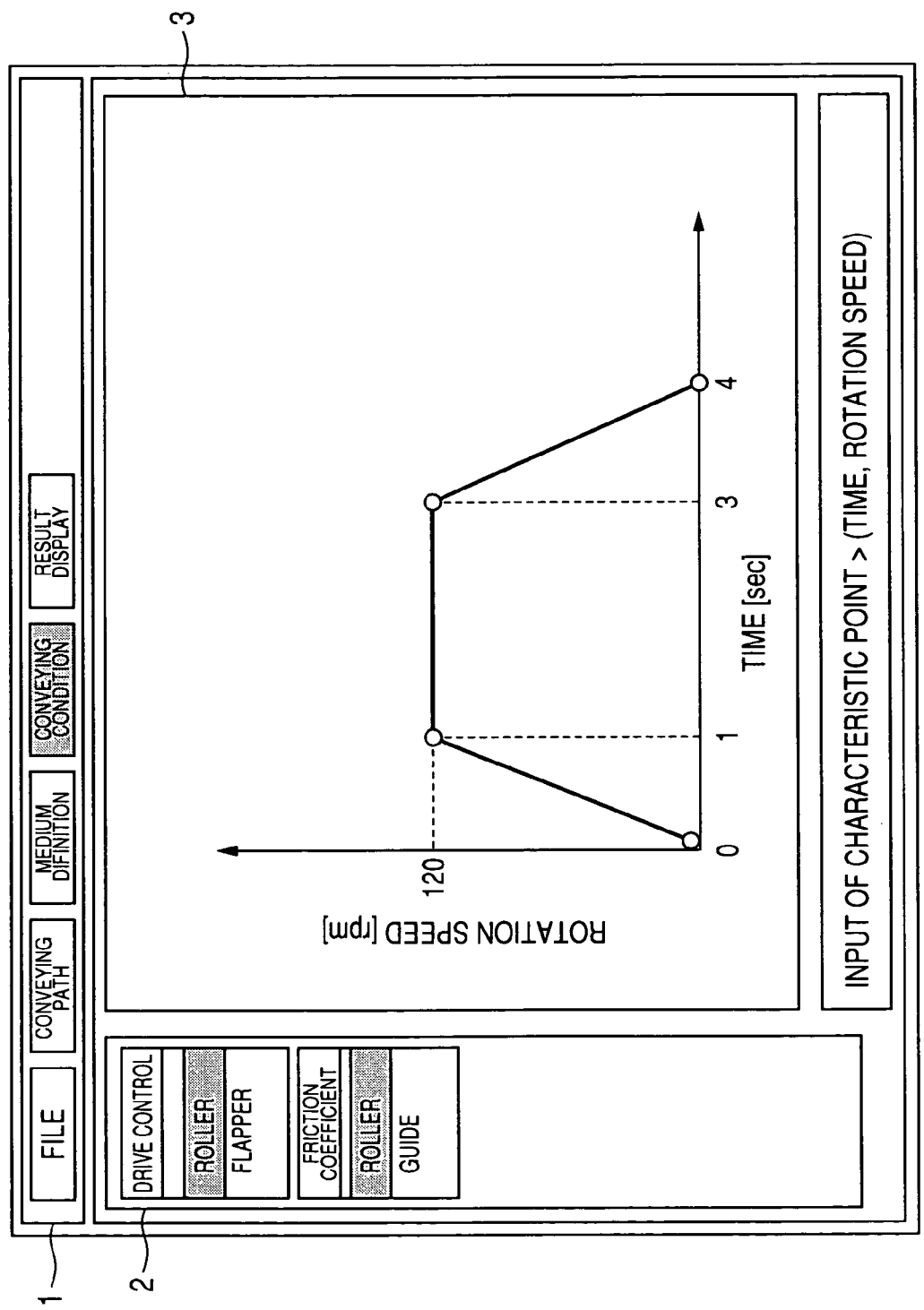
FIG. 6 is a view for explaining a controlling operation of the conveying condition definition step.

In a condition that the roller is selected in the sub arrangement menu 2, a roller of which the driving condition is defined is selected from conveying rollers displayed in the graphic screen 3. At the time when the required roller is selected, when the time and the rotation speed of the roller is inputted to the command column 4 as characteristic points, as shown in FIG. 6, a graph showing the rotation speed of the roller with respect to the time is displayed on the graphic screen 3.

For example, when the characteristic points comprising a combination of (time and rotation speed) is inputted on occasion from the command column 4, a graph can be prepared and displayed on the graphic screen.

In the illustrated embodiment, the characteristic points were inputted in such a way that the rotation speed of the roller is increased from 0 to 120 rpm linearly from 0 second to 1 second and is maintained to 120 rpm from 1 second to 3 seconds and is decreased from 120 rpm to 0 between 3 seconds to 4 seconds. A result shown as a graph in which the abscissa indicates the time and the ordinate indicates the rotation speed of the roller is displayed on the graphic screen 3 of FIG. 4.

The control definition of the flapper used for switching the path is similar to that of the roller except that the ordinate is changed from the rotation speed to an angle. In case of the flapper, the angle may be inputted as an angle varied from an initial angle of 0 degree or may be inputted as an angle with respect to an absolute reference line. From the viewpoint of the fact that the motion amount can be understood and easily judged visually and intuitively, it is preferable that an angle of the flapper under a normal condition is based.

Figure 7:
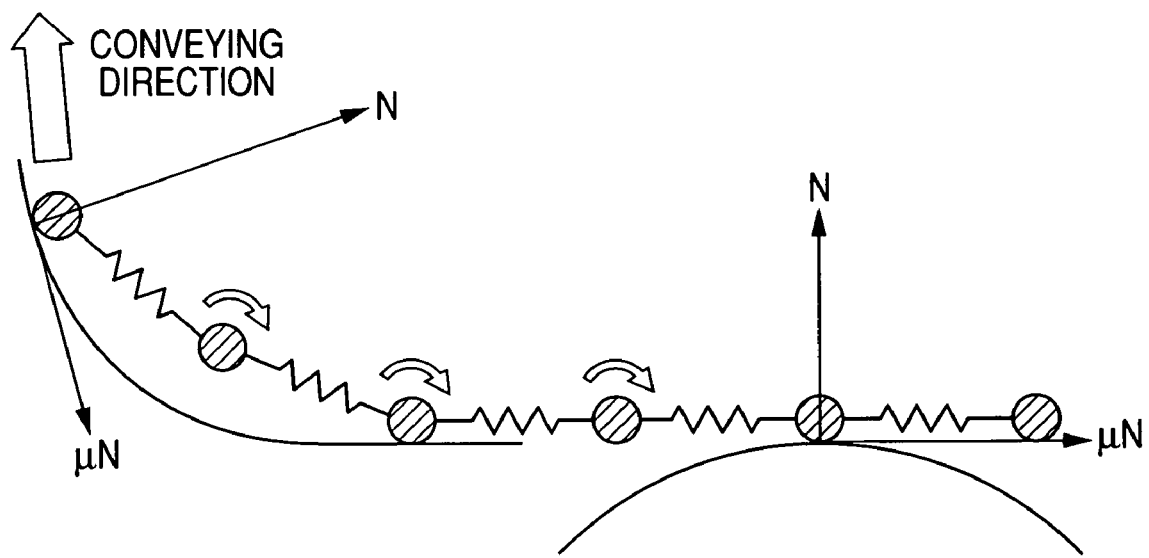
FIG. 7 is a view for explaining a motion of friction coefficient μ.

Also in the definition of the friction coefficient, in a condition that "friction coefficient" in the driving conditions of the sub arrangement menu 2 is selected, the rollers or guides displayed on the graphic screen 3 is selected individually and the friction coefficient $\mu$ between the selected roller or guide and the paper is inputted from the command column 4. By the friction coefficient $\mu$ inputted in this way, as shown in FIG. 7, it is set so that a friction force $\mu N$ (where, N is a vertical drag obtained by contact calculation between the mass point of the flexible medium, and the roller or the guide) acts in a direction opposite to a paper conveying direction.

(Motion Calculation Step)

Figure 8:
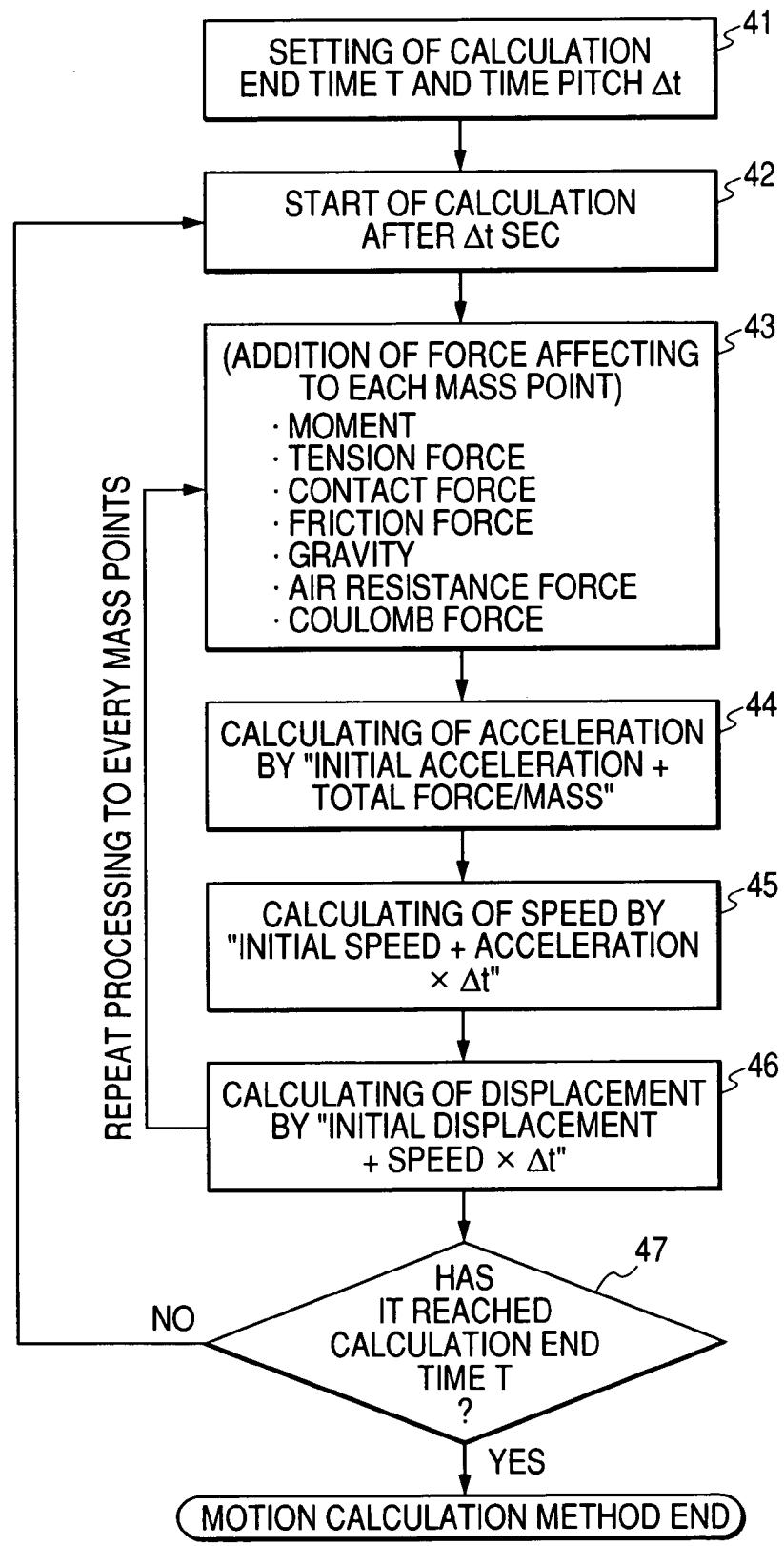
FIG. 8 is a flow chart of a motion calculation step.

Next, an example for performing motion calculation will be explained with reference to a flow chart shown in FIG. 8. First of all, in a block 41, an actual time T for calculating the motion of the flexible medium and a time pitch $\Delta T$ of numerical time integration used for calculating the solution of the motion equation numerically are set.

Blocks 42 to 47 are a loop of the numerical time integration, and the motion of the flexible medium is calculated for every $\Delta T$ from an initial time and calculated results are stored in a memory device.

In the block 42, an initial acceleration, an initial speed and an initial displacement required for performing the calculation after $\Delta T$ sec are set. Regarding these values, whenever one cycle is finished, the calculated results are inputted (That is to say, the values calculated in the previous cycle are used as initial values).

In the block 43, forces acting on the mass points forming the flexible medium are defined. The force includes a rotation moment, a tension force, a contact force, a friction force, gravity, an air resistance force and a coulomb force, and, after forces acting on the respective mass points are calculated, a resultant force thereof is defined as a force ultimately acting on the flexible medium.

In the block 44, acceleration after $\Delta T$ sec is calculated by dividing the force acting on the mass point by mass of the mass point and by adding the initial acceleration.

Similarly, in the block 45, a speed is calculated, and, in the block 46, a displacement is calculated.

In the illustrated embodiment, although an EULAR time integration technique is used for calculating the physical amounts after $\Delta T$ sec in the blocks 43 to 46, another time integration technique such as a KUTTA-MERSON method, a NETMARK-$\beta$ method, an WILLSON-$\theta$ method and the like may be used. In the block 47, it is judged whether the calculation time reaches the actual time T set in the block 41 or not. If reached, the motion calculation step is ended. If not reached, the program is returned to the block 42 again and the time integration is repeated.

(Result Display Step)

Figure 9:
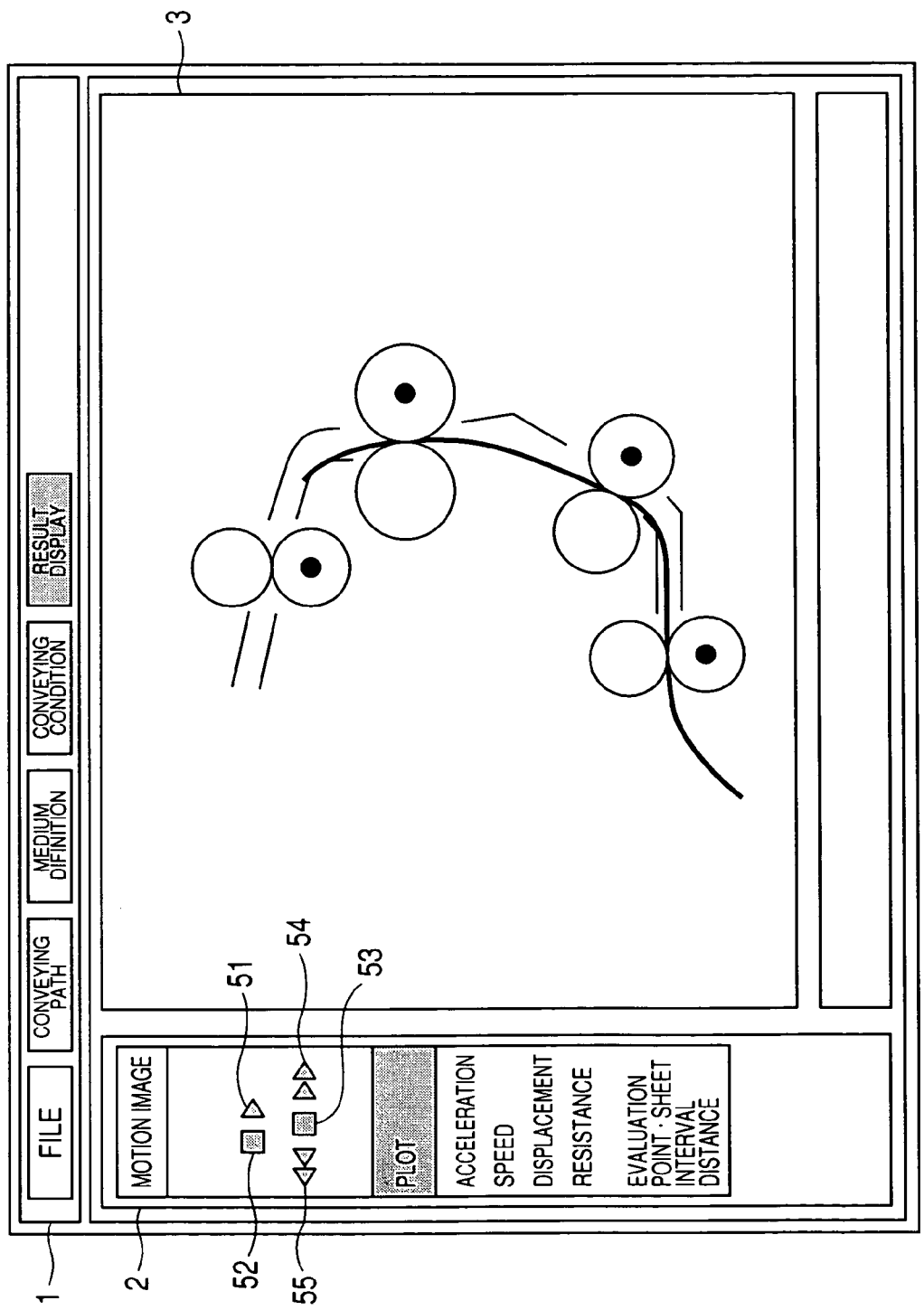
FIG. 9 is a view for explaining a motion image menu in a result display step.

In the result display step 26, when a "result display" button in the menu bar 1 is depressed, a motion image menu and a plot menu are displayed on the sub arrangement menu 2. FIG. 9 shows an example of a motion menu screen according to the illustrated embodiment. In the sub arrangement menu 2, the motion image and the plot can be selected in an enlarged scale and the motion image menu includes a reproduction button 51, a stop button 52, a pause button 53, fast forward button 54 and a rewind button 55. By using these buttons, the behavior of the flexible medium can be visualized in the graphic screen 3.

Figure 10:
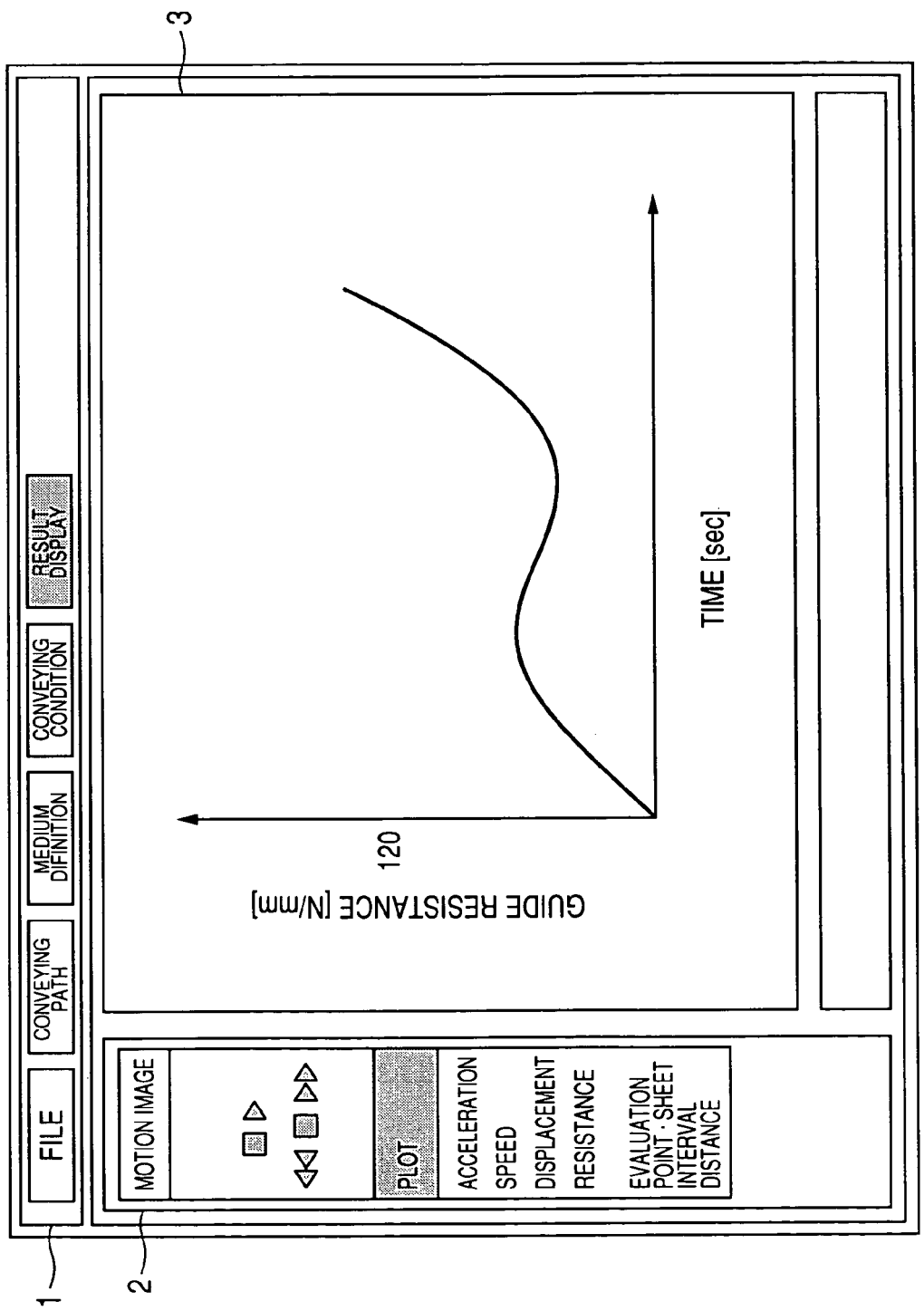
FIG. 10 is a view for explaining a plot menu in the result display step.

After the result display step 26 is finished, the graph display step is started. FIG. 10 shows a plot screen according to the illustrated embodiment. When any calculation result of the acceleration, speed, displacement and resistance of the mass point to be made as a graph is selected from the plot menu, a time-series graph is displayed on the graphic screen 3.

(Roller Nip Calculation Step)

In the conveying condition setting step 23, although the rotation speed of the roller is defined, when the roller is actually formed from an elastic material such as rubber, the speed for conveying the flexible medium is not determined in a meaning manner from the radius and rotation speed of the roller. Further, the posture of the flexible medium passed through between the rollers is changed by the shape of the roller nip portion. The handling in such a case will be explained.

Figure 16:
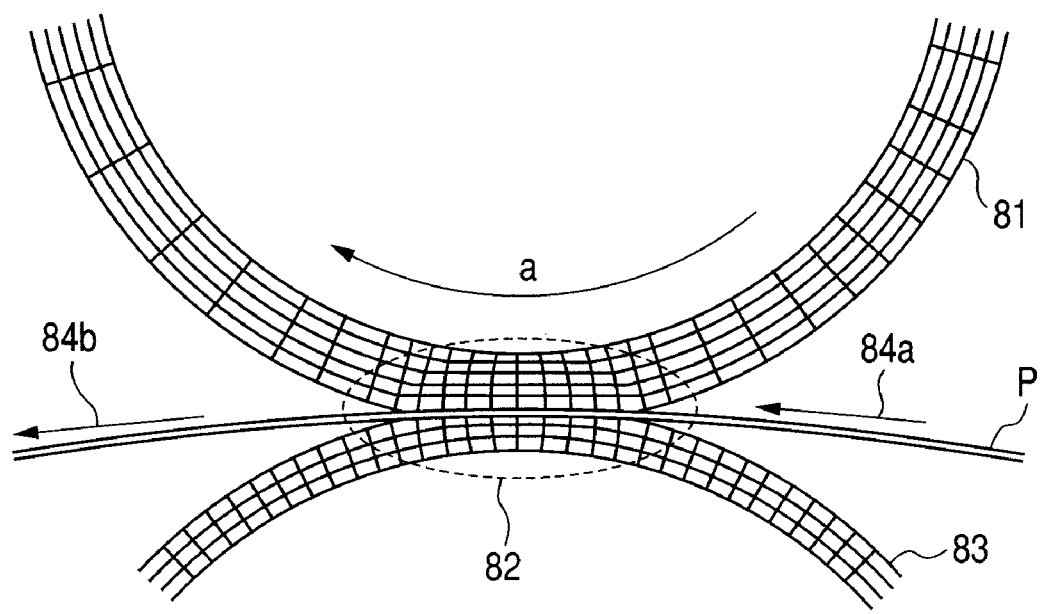
FIG. 16 is a view for explaining a change condition of a pressurized roller.
Figure 17:
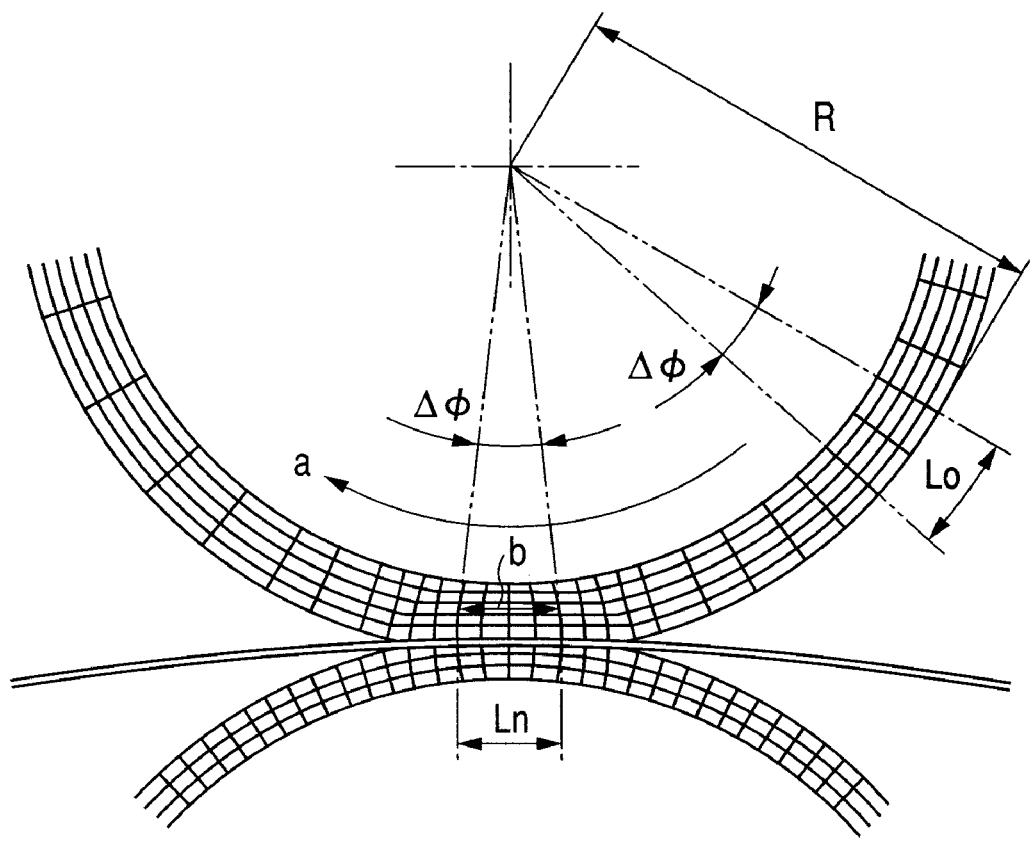
FIG. 17 is a view for explaining a mechanism of speed fluctuation.

This mechanism has been made clear by the contact structure analysis using the conventional finite element model as explained in connection with FIGS. 16 and 17.

In the present invention, the finite element model is limitedly prepared with respect to a portion of the roller pair including at least a roller nip portion, and the speed fluctuation rate and the nip shape are calculated by the contact structure analysis and the obtained result is reflected to the motion calculation step 24.

That is to say, since the preparation and analysis of the finite element model requires a long time, by limitedly preparing the finite element model with respect to the portion of the roller pair including at least the roller nip portion, calculation load is reduced.

Incidentally, the finite element model may be prepared with respect to a portion of the roller pair in the vicinity of the roller nip portion or the finite element model may be prepared with respect to the whole roller pair.

Figure 11A:
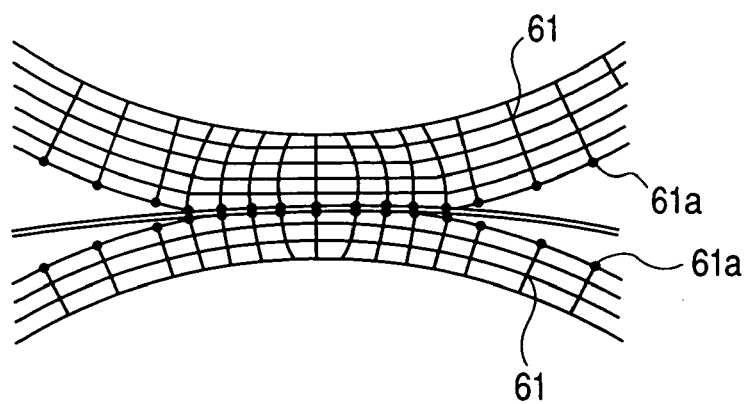
FIGS. 11A, 11B and 11C are views for explaining a flow of a roller nip calculation step.

A flow in this case will be explained with reference to FIGS. 11A to 11C. FIG. 11A shows an example of the finite element model in which the flexible medium P is pinched by a roller (referred to as "elastic roller" hereinafter) pair constituted by elastic materials such as rubber. In the model, contact analysis is performed by giving parameters such as a thickness, Young's modulus and pressure force of the rubber.

Figure 11B:
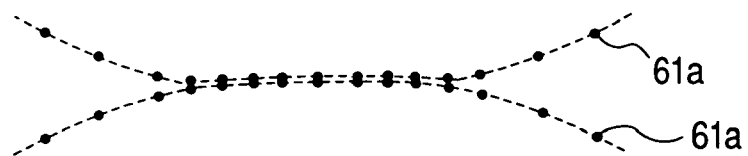

After the well-known contact analysis is performed, among various node points 61 of the model, node points 61a corresponding to peripheral portions of the rollers are extracted by a well-known node point extraction on a free surface (refer to FIG. 11B). From the extracted node point coordinate values, distortion in the circumferential direction at the nip portion is calculated. This distortion value corresponds to the above-mentioned speed fluctuation rate.

Figure 11C:
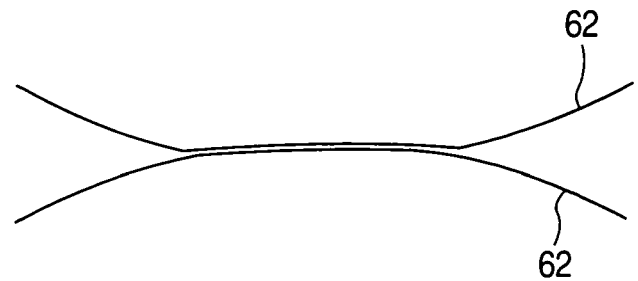

Further, as shown in FIG. 11C, an approximate curve of the roller nip portion is obtained from the extracted node point coordinate values oh the peripheral surface. The acquisition of the approximate curve is carried out by spline interpolation. By defining this curve as the conveying path for the flexible medium in the roller nip portion, the change in the posture of the flexible medium in the roller nip portion is determined.

Now, operating steps to which the influence of the elastic rollers based on the flow of the roller nip calculation step 25 is added will be explained with reference to FIGS. 12 and 13. First of all, in a condition that the "conveying condition" button in the menu bar 1 is depressed and an "elastic roller" definition button 71 in the sub arrangement menu 2 is depressed, a roller 72 in which elastic roller definition thereof is to be performed is selected among conveying rollers displayed on the graphic screen 3.

After the roller is selected, a screen shown in FIG. 13 is displayed and various parameters are inputted. Although the parameter include a drive roller diameter, a driven roller diameter, a rubber thickness, a Young's modulus and a pressure force, it is desirable that all of parameters affecting an influence upon the speed fluctuation rate and the posture of the roller nip portion can be considered.

After the inputting is completed, the values of the parameters are inputted to prepare the finite element model automatically and the contact analysis is carried out. Then, the calculation result 74 of the estimated speed fluctuation rate is displayed. For example, when 60 mm, 60 mm, 100 kgf, 2.5 mm, 2 mm and 1.5 MPa are inputted as the drive roller diameter, driven roller diameter, pressure force, drive roller rubber thickness, driven roller rubber thickness and Young's modulus, respectively, the calculation result becomes 1.055.

When the rotation speed of the selected roller is defined as 120 rpm, the denomination value of the conveying speed becomes 60×3.14×120=22608 mm/min. However, this value becomes 22608×1.055=23851 mm/min, from a result that the speed fluctuation rate is considered. Regarding the selected roller, a conveying speed in which new speed fluctuation is considered is defined.

Then, the roller nip portion defined in the conveying path definition step 21 is defined by reflecting the result of the roller nip calculation step 25.

In this way, according to the illustrated embodiment, regarding a portion of the flexible medium conveyed by the roller pair in which the finite element model thereof is prepared in the roller nip calculation step 25, the behavior of the flexible medium is calculated on the basis of the deformation of the roller calculated in the roller nip calculation step 25. The behavior of the flexible medium is calculated in a time-series manner in the motion calculation step 24.

Further, in the motion calculation step 24, regarding a portion of the flexible medium which is not conveyed by the roller pair in which the finite element model thereof is prepared in the roller nip calculation step 25, the behavior of the flexible medium is calculated in a time-series manner without preparing the finite element model.

Figure 14:
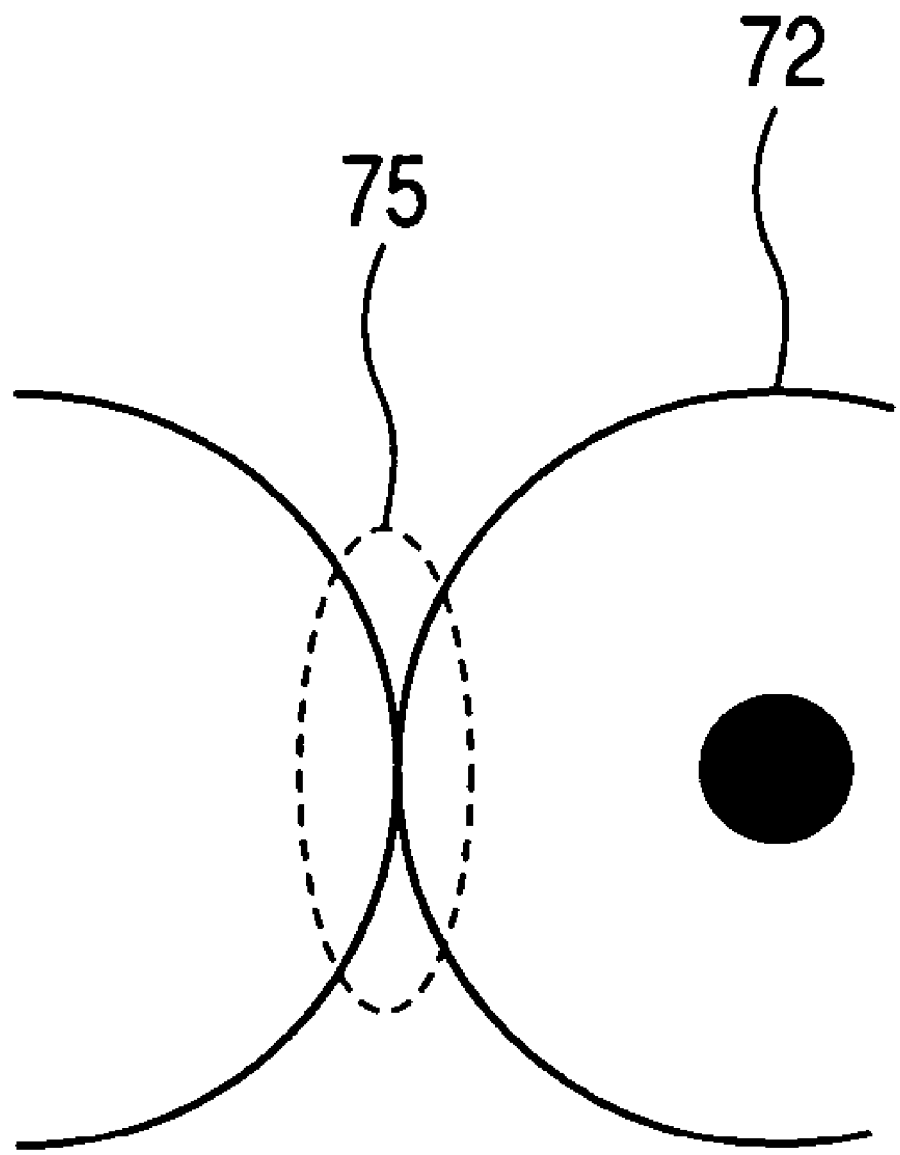
FIG. 14 is an enlarged view of a nip portion in an elastic roller definition picture plane.
Figure 15:
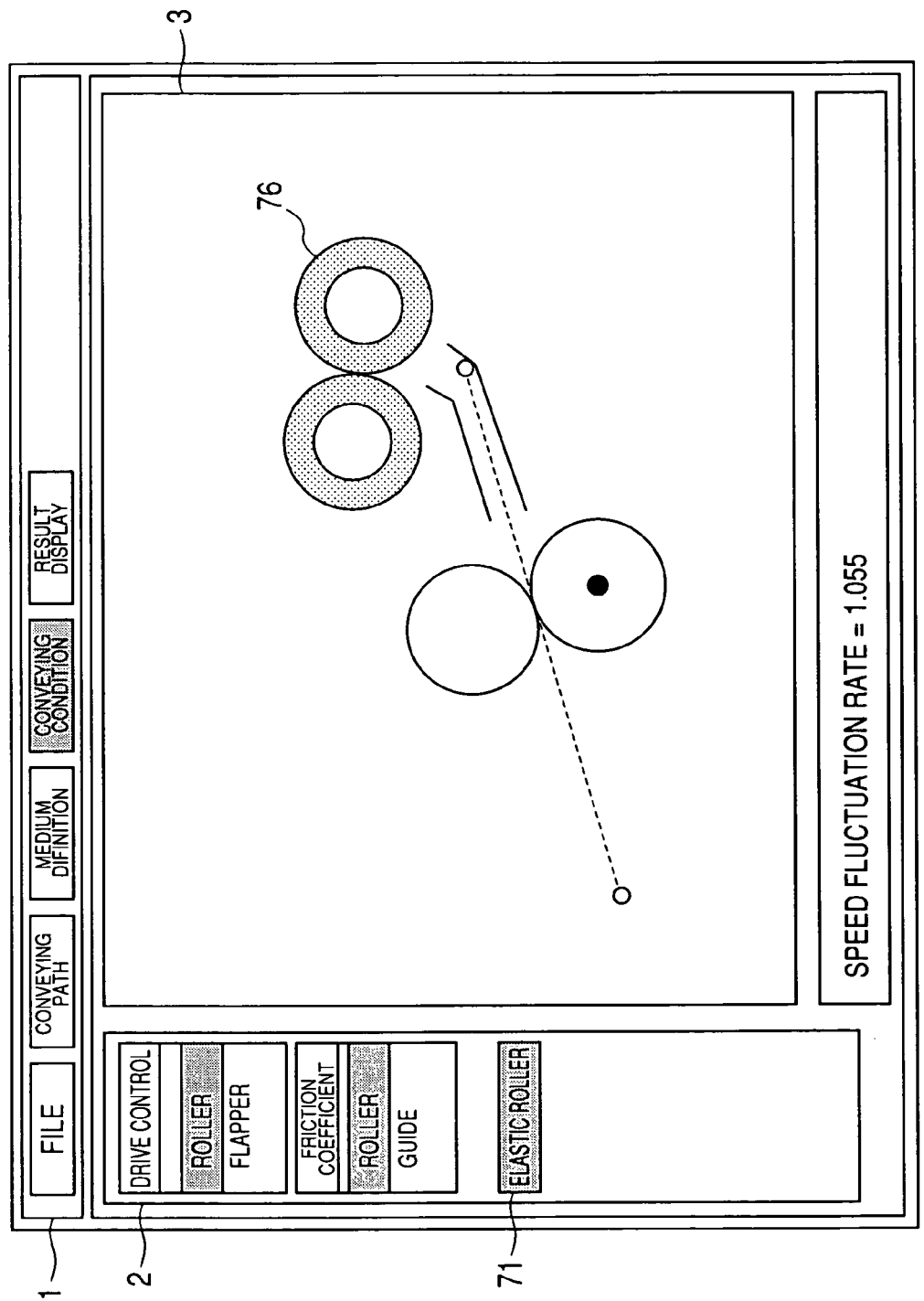
FIG. 15 is a view for explaining screen display upon representing an elastic material of a roller.

FIG. 14 is an enlarged view showing a range 73 in FIG. 12. In the illustrated example, a roller nip portion 75 is as shown FIG. 14. The speed fluctuation rate of the roller in which the roller nip portion is considered is displayed on the command column 4 or on a position in the vicinity of the roller by changing a displaying method in which the roller is shown by a color different from a color of the other roller to easily distinguish it from the other roller as shown by 76 in FIG. 15.

In this way, by defining the conveying condition again in consideration of the speed fluctuation rate due to the deformation of the elastic roller and by performing the calculation of the behavior of the flexible medium in the motion calculation step 24, the behavior simulation of the flexible medium such as tension and slack of the flexible medium can be performed with high accuracy.

This application claims priority from Japanese Patent Application No. 2004-292605 filed Oct. 5, 2004, which is hereby incorporated by reference herein.

What is claimed is:

1. A design support method of supporting a design of a conveying path by performing simulation of a behavior of a sheet-shaped flexible medium being conveyed in said conveying path, comprising:

a conveying condition setting step of setting a conveying condition of a conveying roller for conveying said flexible medium;

a roller nip calculation step of preparing a two-dimensional finite element model of a conveying roller pair including said conveying roller and calculating deformation of said conveying roller in a nip portion of said conveying roller pair;

a motion calculating step of calculating the behavior of said flexible medium in a time-series manner on the basis of the deformation of said conveying roller calculated in said roller nip calculating step regarding where a portion of said flexible medium is nipped by said conveying roller pair having said two-dimensional finite element model prepared in said roller nip calculating step without preparing said two-dimensional finite element model for the portion outside of said nip portion of said conveying roller pair where said flexible medium is not nipped by said conveying roller pair having said two-dimensional finite element model prepared in said roller nip calculating step; and an outputting step of outputting the behavior of said flexible medium obtained in said motion calculating step, wherein said roller nip calculation step determines a posture of said flexible medium in said nip portion of said conveying roller pair by extracting coordinate values of plural node points representing a peripheral surface of said conveying roller of said two-dimensional finite element model in a sectional plane perpendicular to a direction along which said conveying roller is stretched and by obtaining an approximate curve on the basis of the coordinate values of said plural node points representing the peripheral surface of said conveying roller to define a shape of said nip portion as a part of said conveying path.

2. A design support method according to claim 1, wherein said roller nip calculation steps sets said two-dimensional finite element model of said nip portion of said conveying roller pair, and calculates deformation of said nip portion on the basis of input conditions including at least one of a load acting on said conveying roller pair, an outer diameter of said conveying roller, a thickness of an elastic body of said conveying roller, a Young's modulus of said elastic body, or a friction coefficient acting between said conveying roller and said flexible medium.

3. A design support method according to claim 1, wherein said roller nip calculation step further determines a conveying speed of said flexible medium by calculating a conveying speed fluctuation rate on the basis of a value of circumferential distortion of said nip portion of said conveying roller of the two-dimensional finite element model in the sectional plane perpendicular to the direction along which said conveying roller is stretched.

4. A design support method according to claim 1, further comprising a conveying path definition step of defining information regarding the shape of said conveying roller and information regarding a shape of a conveying guide.

5. A design support method according to claim 1, further comprising a flexible medium model preparation step of representing an elastic body by dividing said flexible medium into plural rigid elements each having mass and by connecting said rigid elements to each other by means of springs.

6. A design support method according to claim 1, wherein the behavior of said flexible medium obtained in said motion calculation step is output to a display.

7. A design support method according to claim 1, wherein said roller nip calculation step further determines a conveying speed of said flexible medium in said nip portion.

8. A design support method according to claim 1, wherein the conveying condition of said conveying roller set in said conveying condition setting step includes a driving condition of said conveying roller and a friction coefficient of said conveying roller.

9. A computer-readable storage medium storing a design support program for supporting a design of a conveying path by performing simulation of a behavior of a sheet-shaped flexible medium being conveyed in said conveying path, the program comprising:

a conveying condition setting step of setting a conveying condition of a conveying roller for conveying said flexible medium;

a roller nip calculation step of preparing a two-dimensional finite element model of a conveying roller pair including said conveying roller and calculating deformation of said conveying roller in a nip portion of said conveying roller pair;

a motion calculating step of calculating the behavior of said flexible medium in a time-series manner on the basis of the deformation of said conveying roller calculated in said roller nip calculating step regarding where a portion of said flexible medium is nipped by said conveying roller pair having said two-dimensional finite element model prepared in said roller nip calculating step, without preparing said two-dimensional finite element model for the portion outside of said nip portion of said conveying roller pair where said flexible medium is not nipped by said conveying roller pair having said two-dimensional finite element model prepared in said roller nip calculating step; and an outputting step of outputting the behavior of said flexible medium obtained in said motion calculating step, wherein said roller nip calculation step determines a posture of said flexible medium in said nip portion of said conveying roller pair by extracting coordinate values of plural node points representing a peripheral surface of said conveying roller of said two-dimensional finite element model in a sectional plane perpendicular to a direction along which said conveying roller is stretched and by obtaining an approximate curve on the basis of the coordinate values of said plural node points representing the peripheral surface of said conveying roller to define a shape of said nip portion as a part of said conveying path.

* * * * *